(12) United States Patent  
Corner et al.

(10) Patent No.: US 7,589,036 B2
(45) Date of Patent: *Sep. 15, 2009

(54) FLAME RESISTANT FABRICS HAVING INCREASED STRENGTH

(75) Inventors: Christopher Corner, Atlanta, GA (US); Charles S. Dunn, Mableton, GA (US)

(73) Assignee: Southern Mills, Inc., Union City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/715,317

(22) Filed: Nov. 17, 2003

(65) Prior Publication Data

US 2004/0152378 A1    Aug. 5, 2004

Related U.S. Application Data

(63) Continuation-in-part of application No. 10/269,213, filed on Oct. 3, 2002, now Pat. No. 7,393,800, which is a continuation-in-part of application No. 10/165,795, filed on Jun. 7, 2002, now abandoned.

(51) Int. Cl.
*D03D 15/12* (2006.01)

(52) U.S. Cl. .................. 442/301; 442/302; 57/210; 57/224; 57/229; 57/243; 57/248

(58) Field of Classification Search ............... 442/301, 442/302; 57/243, 248, 210, 224, 229
See application file for complete search history.

(56) References Cited

U.S. PATENT DOCUMENTS

| 3,729,920 | A | * | 5/1973 | Sayers et al. ............. 57/227 |
| 4,304,811 | A | | 12/1981 | David et al. |
| 4,615,934 | A | | 10/1986 | Ellison |
| 4,670,327 | A | * | 6/1987 | Weber ..................... 442/200 |
| 5,141,542 | A | | 8/1992 | Fangeat et al. |
| 5,299,602 | A | | 4/1994 | Barbeau et al. |
| 5,527,597 | A | | 6/1996 | Stanhope et al. |
| 5,597,646 | A | | 1/1997 | Keller |
| 5,694,981 | A | | 12/1997 | Stanhope et al. |
| 5,858,888 | A | | 1/1999 | Underwood et al. |
| 5,928,971 | A | | 7/1999 | Ellis et al. |
| 6,146,759 | A | * | 11/2000 | Land ....................... 428/370 |
| 6,410,140 | B1 | * | 6/2002 | Land et al. ............... 428/377 |
| 6,460,321 | B1 | | 10/2002 | Koshimae et al. |
| 6,534,175 | B1 | | 3/2003 | Zhu et al. |
| 6,624,096 | B2 | * | 9/2003 | Thomas et al. ............. 442/181 |
| 6,668,868 | B2 | | 12/2003 | Howland et al. |
| 6,691,317 | B2 | | 2/2004 | Cochran |
| 6,790,795 | B2 | | 9/2004 | Erb, Jr. et al. |
| 2002/0124544 | A1 | | 9/2002 | Land et al. |
| 2002/0155773 | A1 | | 10/2002 | Maini |
| 2003/0203690 | A1 | | 10/2003 | Hess et al. |
| 2003/0226612 | A1 | | 12/2003 | Zhu et al. |
| 2003/0228821 | A1 | | 12/2003 | Zhu et al. |
| 2004/0029473 | A1 | | 2/2004 | McKee et al. |
| 2004/0065072 | A1 | | 4/2004 | Zhu et al. |
| 2004/0152378 | A1 | | 8/2004 | Stanhope et al. |
| 2005/0032449 | A1 | | 2/2005 | Lovasic et al. |

FOREIGN PATENT DOCUMENTS

JP          09310236         12/1997

* cited by examiner

*Primary Examiner*—Ula C Ruddock
(74) *Attorney, Agent, or Firm*—Kilpatrick Stockton LLP

(57) ABSTRACT

In one embodiment, a flame resistant fabric includes a plurality of flame resistant body yarns that form a body of the fabric, and a plurality of relatively tough yarns provided in discrete positions within the fabric body, the relatively tough yarns comprising a filament yarn that includes a filament composed of one of polyolefin, flame resistant polyester, polytetrafluoroethylene, polyetheretherketone, polyetherimide, polysulfar, polyimide, polyamide, polyimideamide, polybenzoxazole, polybenzimidazole, carbon, and glass.

25 Claims, 5 Drawing Sheets

FLAME RESISTANT FABRICS HAVING INCREASED STRENGTH

CROSS-REFERENCE TO RELATED APPLICATIONS

This application is a continuation in part of U.S. patent application Ser. No. 10/269,213, filed on Oct. 3, 2002, now U.S. Pat. No. 7,393,800 entitled "Flame Resistant Fabrics Having Increased Strength and Abrasion Resistance," which is a continuation in part of U.S. patent application Ser. No. 10/165,795, filed Jun. 7, 2002, now abandoned entitled "Flame Resistant Fabrics Comprising Filament Yarns," both of which are entirely incorporated herein by reference.

BACKGROUND

Several occupations require the individual to be exposed to extreme heat and/or flames. To avoid being injured while working in such conditions, these individuals typically wear protective garments constructed of special flame resistant materials designed to protect them from both heat and flame.

To cite an example, firefighters typically wear protective garments commonly referred to in the industry as turnout gear. Such turnout gear normally comprises various garments including, for instance, coveralls, trousers, and jackets. These garments usually include several layers of material including, for example, an outer shell that protects the wearer from flames, a moisture barrier that prevents the ingress of water into the garment, and a thermal barrier that insulates the wearer from extreme heat.

Turnout gear outer shells typically comprise woven fabrics formed of one or more types of flame resistant fibers. In that the outer shell must withstand flame, excessive heat, and abrasion, it must be constructed of a flame resistant material that is both strong and durable. The National Fire Protection Association (NFPA) provides guidelines as to the strength a fabric must have in order to be used in the construction of outer shells. According to NFPA 1971, 2000 edition, the fabric must exhibit a tensile strength of at least 140 pounds (lbs.) in the warp and filling directions, and a trapezoidal tear strength of at least 22 lbs. in the warp and filling directions. The NFPA provides detailed guidelines as to the manner in which testing is to be conducted to determine both tensile strength and tear strength.

SUMMARY

Disclosed are flame resistant fabrics. In one embodiment, a flame resistant fabric includes a plurality of flame resistant body yarns that form a body of the fabric, and a plurality of relatively tough yarns provided in discrete positions within the fabric body, the relatively tough yarns comprising a filament yarn that includes a filament composed of one of polyolefin, flame resistant polyester, polytetrafluoroethylene, polyetheretherketone, polyetherimide, polysulfar, polyimide, polyamide, polyimideamide, polybenzoxazole, polybenzimidazole, carbon, and glass.

An embodiment of a method for forming a flame resistant fabric includes arranging a plurality of flame resistant spun yarns to form a body of the fabric, and forming a grid of relatively tough yarns in the fabric body, each relatively tough yarn comprising a filament yarn including a filament composed of one of polyolefin, flame resistant polyester, polytetrafluoroethylene, polyetheretherketone, polyetherimide, polysulfar, polyimide, polyamide, polyimideamide, polybenzoxazole, polybenzimidazole, carbon, and glass.

BRIEF DESCRIPTION OF THE DRAWINGS

The disclosed fabrics can be better understood with reference to the following drawings. The components in the drawings are not necessarily to scale.

DETAILED DESCRIPTION

Figure 1:
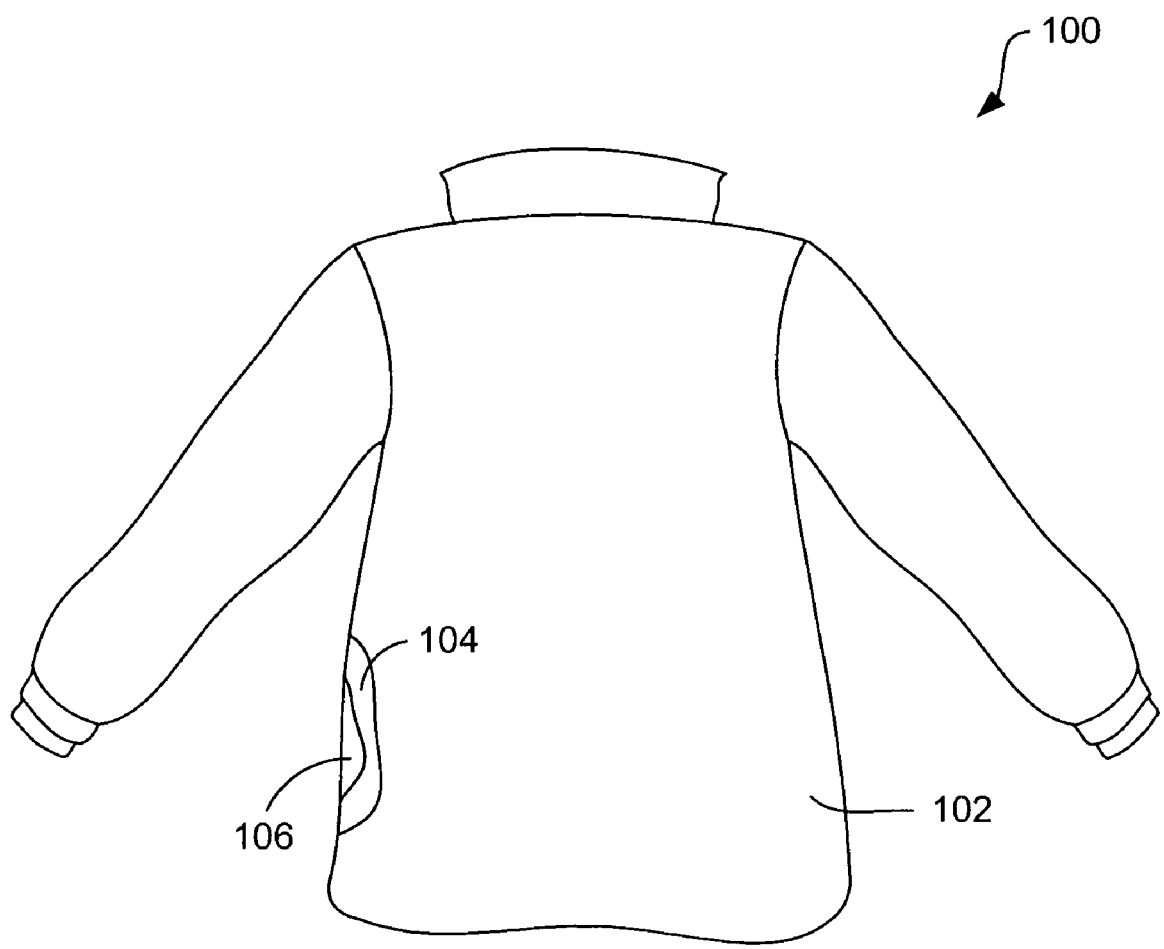
FIG. 1 is a rear view of an example protective garment.

FIG. 1 illustrates an example protective garment 100. More particularly, FIG. 1 illustrates a firefighter turnout coat that can be donned by firefighter personnel when exposed to flames and extreme heat. It is noted that, although a firefighter turnout coat is shown in the figure and described herein, the present disclosure pertains to protective garments generally. Accordingly, the identification of firefighter turnout gear is not intended to limit the scope of the disclosure. For example, other protective garments include urban search and rescue garments and wildlands firefighting garments.

As indicated in FIG. 1, the example garment 100 generally comprises an outer shell 102 that forms the exterior surface of the garment, a moisture barrier 104 that forms an intermediate layer of the garment, and a thermal liner 106 that forms the interior surface (i.e., the surface that contacts the wearer) of the garment. In that it forms the exterior surface of the garment 100, the outer shell 102 preferably is constructed so as to be flame resistant to protect the wearer against being burned. In addition, the outer shell 102 preferably is strong and durable so as to be resistant to tearing and abrasion during use in extreme environments.

The fabric includes relatively tough yarns in the fabric body, for instance in a grid pattern. As is known in the art, "toughness" is a property that pertains to a material's (in this case yarn's) ability to resist breakage. The term "relatively tough" is used herein to describe yarns that have higher toughness than the remainder of the yarns (i.e., body yarns) of the fabric.

Figure 2:
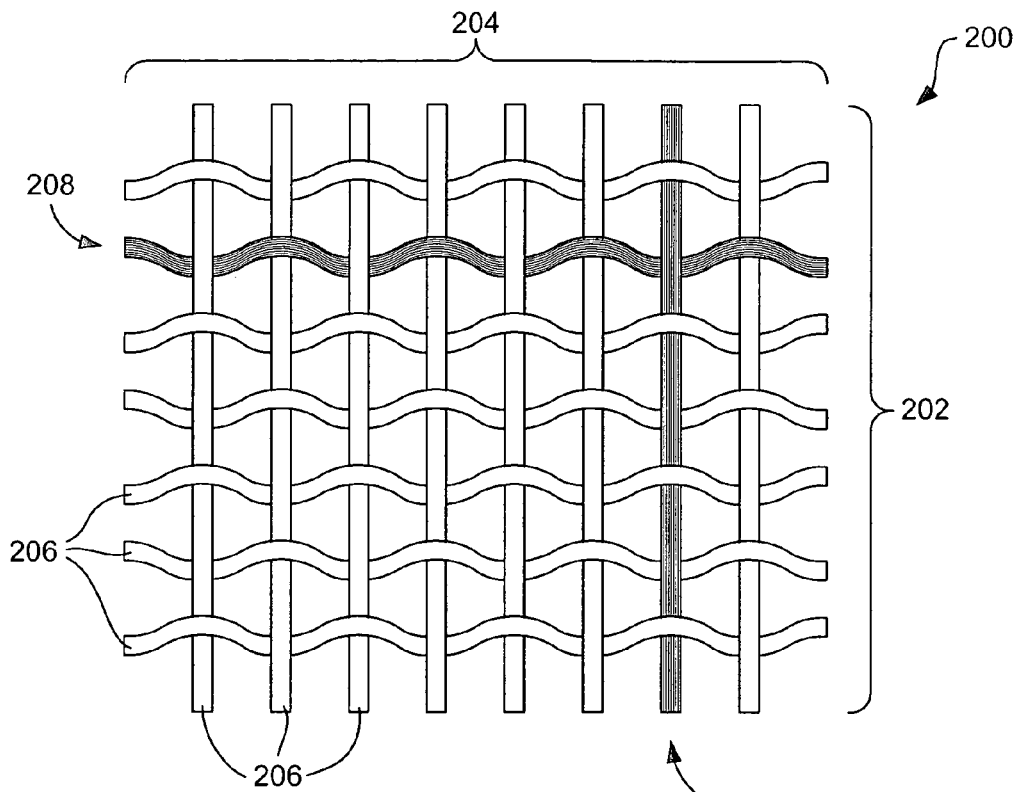
FIG. 2 is a schematic representation of a first example fabric that can be used in the construction of the garment of FIG. 1.

FIG. 2 is a schematic view of a first example fabric 200 that can be used in the construction of the protective garment 100, and more particularly the outer shell 102, shown in FIG. 1. As noted above, however, the fabric 200 could be used in the construction of other protective garments either by itself or in combination with other fabrics. As indicated in the figure, the fabric 200 can be formed as a plain weave fabric that comprises a plurality of body yarns 206, including picks 202 and ends 204. Although a plain weave is illustrated and described herein, it will be appreciated that other configurations could be used including, for instance, a rip-stop, twill weave, or knitted configuration.

The majority of the body yarns 206 comprise spun yarns that are constructed of a flame resistant material such as meta-aramid, para-aramid, flame resistant cellulosic materials (e.g., flame resistant cotton, rayon, or acetate), flame resistant wool, flame resistant polyester, polyvinyl alcohol, polytetrafluoroethylene, polyvinyl chloride (PVC), polyetheretherketone, polyetherimide, polysulfar, polychlal, polyimide, polyamide, polyimideamide, polyolefin, polybenzoxazole (PBO), polybenzimidazole (PBI), carbon, modacrylic, melamine, or other suitable flame resistant material. Most preferably, the spun yarns are composed of at least one of meta-aramid, para-aramid, PBI, and PBO. Each body yarn 206 can comprise a single yarn or two or more individual yarns that are twisted, or otherwise combined, together. Typically, the body yarns 206 comprise one or more yarns that each have a yarn count in the range of approximately 5 to 60 cc, with 8 to 40 cc being preferred. By way of example, the body yarns 206 comprise two yarns that are twisted together, each having a yarn count in the range of approximately 10 to 25 cc.

In addition to the body yarns 206, provided in both the warp and filling directions of the fabric 200 are relatively tough yarns 208, whose construction is described in greater detail below.

The arrangement of the relatively tough yarns 208 within the fabric 200 can be varied depending upon the desired physical properties. In the arrangement shown in FIG. 2, the fabric 200 is constructed such that the relatively tough yarns 208 are arranged in a grid pattern in which several body yarns 206 are placed between each consecutive relatively tough yarn 208 in both the warp and filling directions of the fabric. As an example, one relatively tough yarn 208 is provided in the fabric in both the warp and filling directions of the fabric for every approximately seven to nine body yarns 206. Alternatively, two or more relevantly tough yarns 208 can be woven along with each other in the fabric 200 to form a rip-stop fabric (see FIG. 10). Typically, the grid pattern is arranged so as to comprise a plurality of squares. To accomplish this, a greater number of body yarns 206 may need to be provided between consecutive relatively tough yarns 208 in the filling direction as compared to the warp direction.

Each relatively tough yarn 208 comprises a filament yarn that includes one or more individual continuous filaments. Accordingly, a given filament yarn can comprise a monofilament yarn or a multifilament yarn. In the latter case, several hundred continuous filaments that are twisted together may be used to form the relatively tough yarn 208. Each filament yarn comprises one or more individual filaments composed of a strong material such as polyolefin (e.g., high density polyethylene), flame resistant polyester, polytetrafluoroethylene, polyetheretherketone, polyetherimide, polysulfar, polyimide, polyamide, polyimideamide, polybenzoxazole (PBO), polybenzimidazole (PBI), carbon, glass, or combinations thereof. Of these, PBO, carbon, glass, and high density polyethylene (e.g., Spectra™ or Dynemma™) are preferred. The weight of the filament yarns typically range from approximately 50 to 1000 denier, with the range of 100 to 600 denier being preferred.

Optionally, the fabric 200 can be configured so that the relatively tough yarns 208 do not protrude beyond the outer surface of the fabric such that the fabric shields the relatively tough yarns from abrasion. This end result can be achieved in a variety of different ways. In one solution, the relatively tough yarns 208 are constructed so as to have effective diameters that are equal to or less than those of the body yarns 206 that form the body of the fabric 200. In another solution, the linear density and/or weight of the relatively tough yarns 208 is less than or equal to that of the body yarns 206, assuming each has the same specific gravity.

Figure 3:
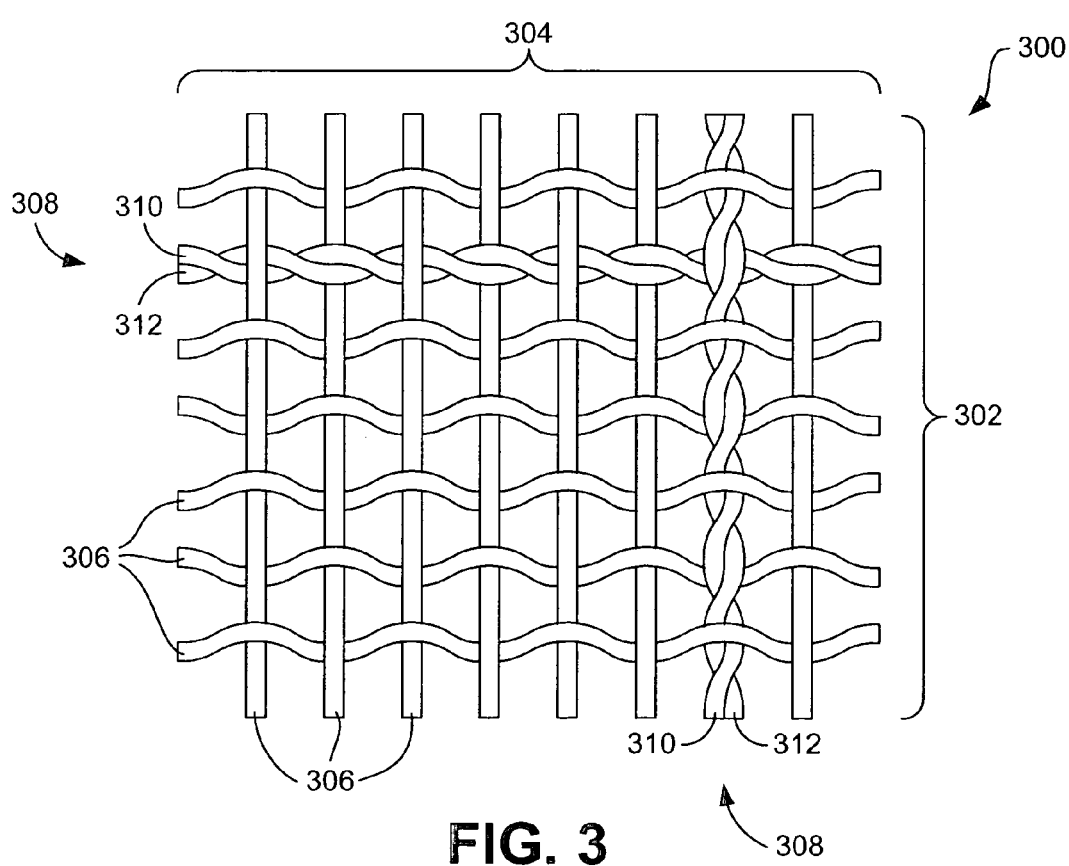
FIG. 3 is a schematic representation of a second example fabric that can be used in the construction of the garment of FIG. 1.

FIG. 3 is a schematic view of a second example fabric 300 that can be used in the construction of the protective garment 100, and more particularly the outer shell 102, shown in FIG. 1. Again, the fabric 300 could be used in the construction of other protective garments either by itself or in combination with other fabrics. The fabric 300 is formed as a plain weave fabric that, like the fabric 200 of FIG. 2, comprises a plurality of body yarns 306, including picks 302 and ends 304.

The body yarns 306 have configurations similar to the body yarns 206 of the fabric 200. Therefore, a majority of the body yarns 306 of the fabric 300 comprise spun yarns that are constructed of a flame resistant material such as meta-aramid, para-aramid, flame resistant cellulosic materials (e.g., flame resistant cotton, rayon, or acetate), flame resistant wool, flame resistant polyester, polyvinyl alcohol, polytetrafluoroethylene, polyvinyl chloride (PVC), polyetheretherketone, polyetherimide, polysulfar, polychlal, polyimide, polyamide, polyimideamide, polyolefin, polybenzoxazole (PBO), polybenzimidazole (PBI), carbon, modacrylic, melamine, or other suitable flame resistant material. Each body yarn 306 can comprise a single yarn or two or more individual yarns that are twisted, or otherwise combined, together. Typically, the body yarns 306 comprise one or more yarns that each have a yarn count in the range of approximately 5 to 60 cc, with 8 to 40 cc being preferred. By way of example, the body yarns 306 comprise two yarns that are twisted together, each having a yarn count in the range of approximately 10 to 25 cc.

In addition to the body yarns 306, provided in both the warp and filling directions of the fabric 300 are relatively tough yarns 308. The relatively tough yarns 308 each comprise at least one filament yarn having a configuration similar to the filament yarns described in relation to the fabric 200 of FIG. 2. Therefore, each relatively tough yarn 308 comprises a filament yarn that includes one or more filaments composed of a strong material such as polyolefin (e.g., high density polyethylene), flame resistant polyester, polytetrafluoroethylene, polyetheretherketone, polyetherimide, polysulfar, polyimide, polyamide, polyimideamide, polybenzoxazole (PBO), polybenzimidazole (PBI), carbon, glass, or combinations thereof. Of these, PBO, carbon, glass, and high density polyethylene (e.g., Spectra™ or Dynemma™) are preferred. The weight of the filament yarns typically range from approximately 50 to 1000 denier, with the range of 100 to 600 denier being preferred.

As shown in FIG. 3, the relatively tough yarns 308 comprise two individual yarns 310 and 312 that are combined together and then woven (or otherwise provided) into the fabric 300. Both of the yarns 310 and 312 may comprise filament yarns composed of the materials discussed above. Alternatively, however, one of the yarns 310, 312 can comprise a spun yarn. Like the body yarns 306, the spun yarns of the relatively tough yarns can be composed of a material such as meta-aramid, para-aramid, flame resistant cellulosic materials (e.g., flame resistant cotton, rayon, or acetate), flame resistant wool, flame resistant polyester, polyvinyl alcohol, polytetrafluoroethylene, polyvinyl chloride (PVC), polyetheretherketone, polyetherimide, polysulfar, polychlal, polyimide, polyamide, polyimideamide, polyolefin, (i.e., high density polyethylene) polybenzoxazole (PBO), polybenzimidazole (PBI), carbon, modacrylic, melamine, or other suitable flame resistant material. Normally, each spun yarn of each relatively tough yarn 308 has a yarn count in the range of 5 to 60 cc, with the range 8 to 55 cc being preferred.

The arrangement of the relatively tough yarns 308 within the fabric 300 can be varied depending upon the desired physical properties. In the arrangement shown in FIG. 3, the fabric 300 is constructed such that the relatively tough yarns 308 are arranged in a grid pattern in which several body yarns 306 are placed between each consecutive relatively tough yarn 308 in both the warp and filling directions of the fabric. As an example, one relatively tough yarn 308 is provided in the fabric in both the warp and filling directions of the fabric for every approximately seven to nine body yarns 306. Alternatively, two or more relevantly tough yarns 308 can be woven along with each other in the fabric 300 to form a rip-stop fabric (see FIG. 10). Typically, the grid pattern is arranged so as to comprise a plurality of squares. To accomplish this, a greater number of body yarns 306 may need to be provided between consecutive relatively tough yarns 308 in the filling direction as compared to the warp direction.

As with the fabric 200 of FIG. 2, the fabric 300 can be configured so that the relatively tough yarns 308 do not protrude beyond the outer surface of the fabric such that the fabric shields the relatively tough yarns from abrasion. This end result can be achieved by, for example, constructing the relatively tough yarns 308 so as to have effective diameters that are equal to or less than those of the body yarns 306 that form the body of the fabric 300, or constructing the relatively tough yarns 308 such that the linear density and/or weight of the relatively tough yarns is less than or equal to that of the body yarns.

FIGS. 4-7 illustrate various examples of relatively tough yarns that can be used in the fabric 300 shown in FIG. 3. In these figures, it is assumed that a filament yarn and a spun yarn are combined to form the relatively tough yarn. As noted above, however, the relatively tough yarns can, alternatively, comprise two filament yarns that are combined together.

Figure 4:
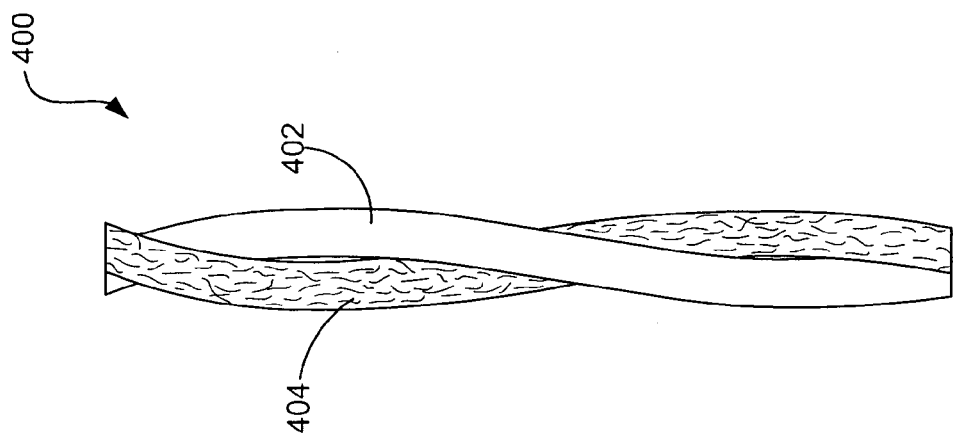
FIG. 4 is a schematic representation of a first relatively tough yarn that can be used to form the fabric of FIG. 3.

Beginning with FIG. 4, shown is a relatively tough yarn 400 that comprises first and second yarns 402 and 404, which are plied together. The first yarn 402 comprises a filament yarn and the second yarn 404 comprises a spun yarn that are loosely twisted together so as to form an integral yarn that can be used as a pick or end as the case may be.

Figure 5:
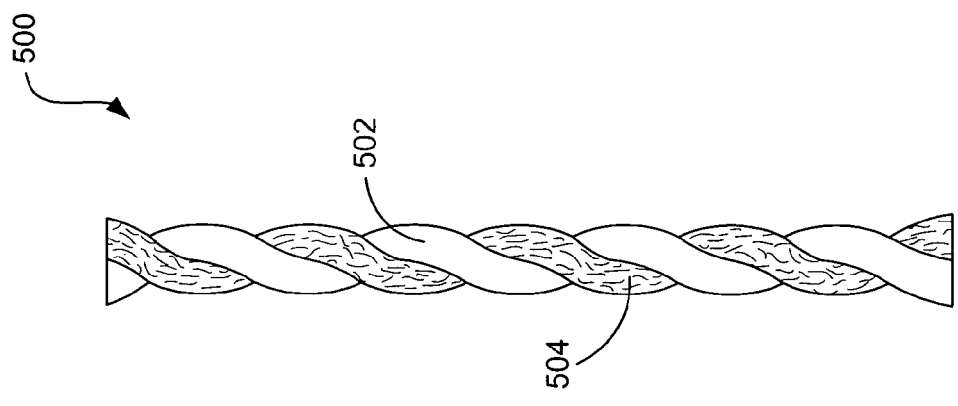
FIG. 5 is a schematic representation of a second relatively tough yarn that can be used to form the fabric of FIG. 3.

FIG. 5 illustrates a variant of the relatively tough yarn 400 shown in FIG. 4. In particular, the relatively tough yarn 500, like yarn 400, includes first and second yarns 502 and 504 that comprise a filament yarn and a spun yarn, respectively. However, the relatively tough yarn 500 is formed as a tightly-twisted yarn such that the first yarn 502 and second yarn 504 are more intimately associated along the length of the relatively tough yarn.

Figure 6:
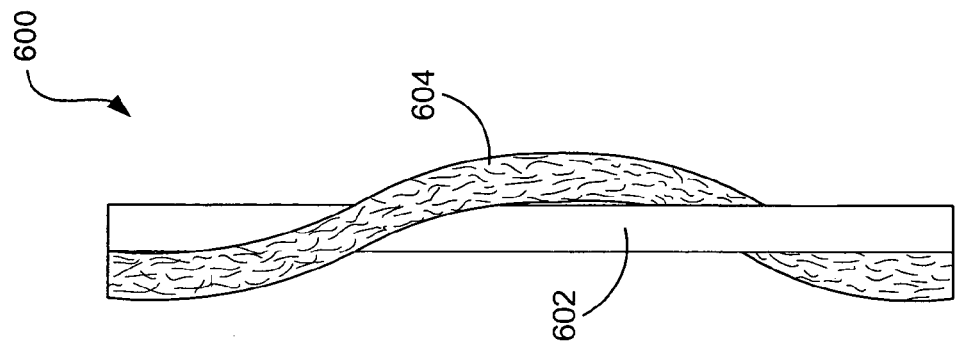
FIG. 6 is a schematic representation of a third relatively tough yarn that can be used to form the fabric of FIG. 3.
Figure 7:
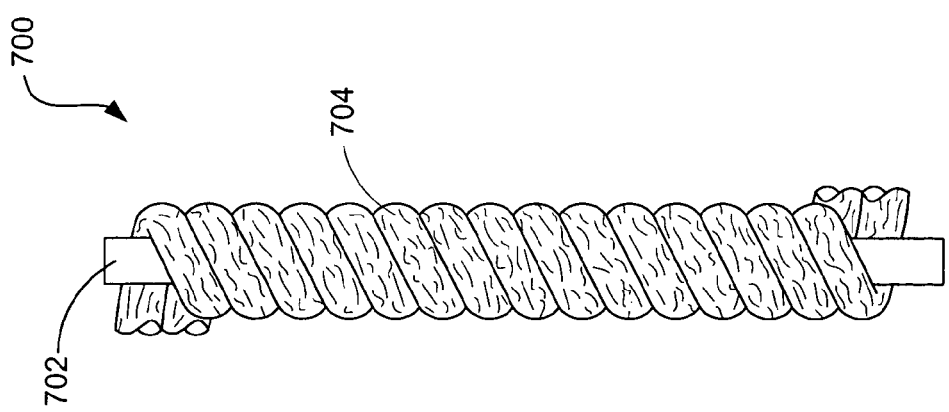
FIG. 7 is a schematic representation of a fourth relatively tough yarn that can be used to form the fabric of FIG. 3.

FIG. 6 illustrates a relatively tough yarn 600 in which a first (filament) yarn 602 is loosely wrapped with a second (spun) yarn 604 to create a core-wrapped arrangement. FIG. 7 illustrates a more tightly core-wrapped arrangement of a relatively tough yarn 700 that includes a filament core yarn 702 that is substantially completely surrounded by a pair of spun yarns 704. Although two yarns 704 are shown wrapped around the core yarn 702 in FIG. 7, it will be appreciated that fewer or greater such yarns could be wrapped around the core yarn in this manner.

Although the relatively tough yarn 308 has been shown and described as comprising two individual yarns that are combined together, three or more individual yarns could be combined, if desired, to form the relatively tough yarn (see, e.g., the discussion of yarn 700 above).

Figure 8:
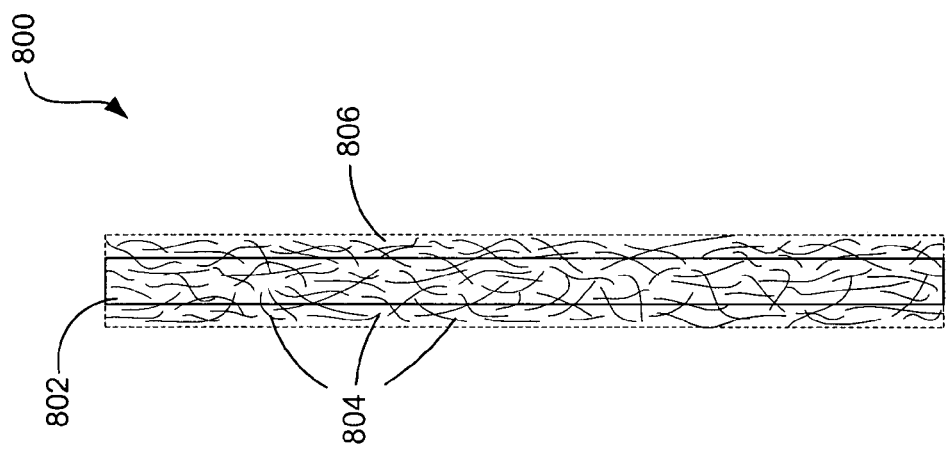
FIG. 8 is a schematic representation of an alternative relatively tough yarn that can be used to form the fabric of FIG. 2 or 3.

FIG. 8 illustrates an alternative yarn 800 that may be used to form a relatively tough yarn either alone (e.g., fabric 200, FIG. 2) or together with another yarn (e.g., fabric 300, FIG. 3), and incorporated into a flame resistant fabric to strengthen the fabric. The yarn 800 includes a filament core yarn 802 about which a plurality of individual staple fibers 804 are spun to form a fiber sheath 806 that surrounds the core yarn. By way of example, the staple fibers can be spun around the core yarn 802 using a dref spin procedure or air jet spinning process. The filament core yarn 802 and the staple fibers 804 can be constructed of one or more of the various materials identified above for respective construction of the filament and spun yarns identified above.

Figure 9:
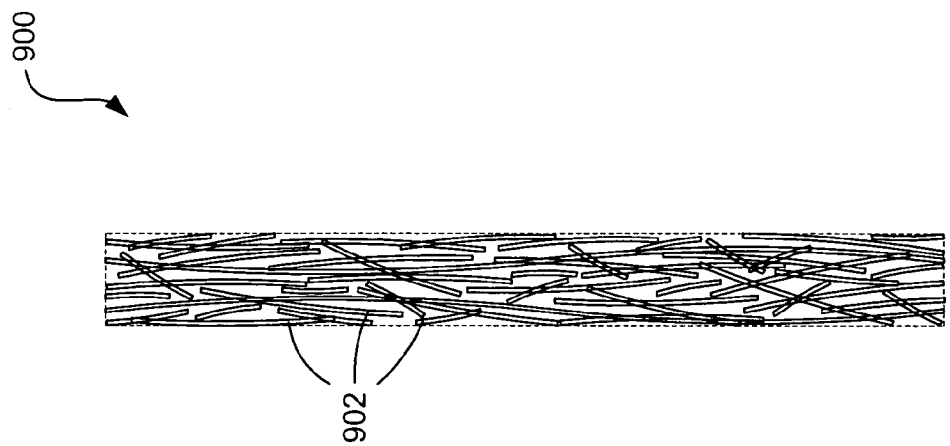
FIG. 9 is a schematic representation of a further alternative relatively tough yarn that can be used to form the fabric of FIG. 2 or 3.

FIG. 9 illustrates a further alternative yarn 900 that may be used to form a relatively tough yarn either alone (e.g., fabric 200, FIG. 2) or together with another yarn (e.g., fabric 300, FIG. 3), and incorporated into a flame resistant fabric to strengthen the fabric. The yarn 900 comprises a stretch broken yarn that includes broken filaments 902 that may be twisted together. The broken filaments 902 can be constructed of one or more of the various materials identified above for construction of filament yarns. Although the yarn 900 may not be as strong as yarns comprising continuous filament, it will normally be stronger than the body yarns of the fabric in which the yarn 900 is used.

Figure 10:
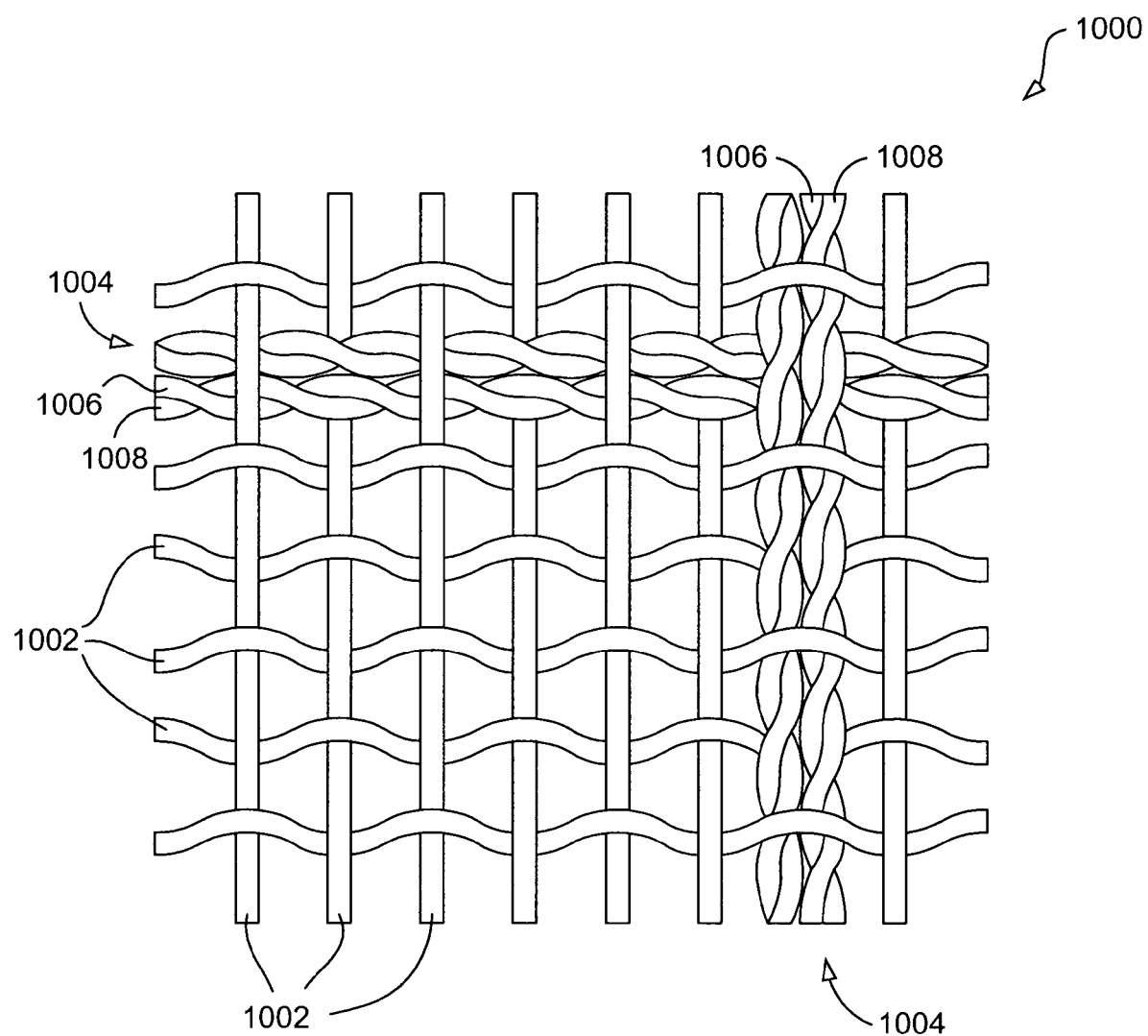
FIG. 10 is a schematic representation of a third example fabric that can be used in the construction of the garment of FIG. 1.

FIG. 10 is a schematic view of an example rip-stop fabric 1000 that can be used in the construction of the protective garment 100. The fabric 1000 comprises body yarns 1002 that form the body of the fabric and that have composition and construction similar to any of those described above. In the fabric 1000, however, two relatively tough yarns 1004 are woven along with each other in a grid pattern within the body of the fabric to form a traditional rip-stop weave. In the example of FIG. 10, the relatively tough yarns 1004 comprise two individual yarns 1006 and 1008 that are combined together. Notably, groups of more than two relatively tough yarns 1004 may be used, if desired, to form the grid pattern. The resultant fabric 1000 typically has a weight of approximately 3 to 12 ounces per square yard (osy).

With the arrangements disclosed herein, the tear strength of the fabric is increased due to the provision of the relatively tough yarns. Although the relatively tough yarns have been described as comprising filaments, it is noted that the relatively tough yarns could, alternatively, comprise non-filament yarns, such as spun yarns, depending upon the material used to construct the yarns. For example, that relatively tough yarns can comprise one or more PBI spun yarns that comprise PBI fibers either exclusively or in a blend with other fibers.

The invention claimed is:

1. A flame resistant fabric, comprising:
  a plurality of flame resistant body yarns that form a body of the fabric, wherein each body yarn comprises a diameter; and
  a plurality of relatively tough yarns provided in discrete positions within the fabric body, wherein each relatively tough yarn comprises a diameter and wherein at least some relatively tough yarns each comprises a filament yarn that comprises a filament comprising at least one of a polyolefin, flame resistant polyester, polytetrafluoroethylene, polyetheretherketone, polyetherimide, polysulfar, polyimide, polyamide, polyimideamide, polybenzoxazole, polybenzimidazole, carbon, or glass;
  wherein the diameter of the relatively tough yarns is the same or smaller than the diameter of the body yarns so that the relatively tough yarns do not protrude beyond an outer surface of the fabric body.

2. The fabric of claim 1, wherein at least some body yarns comprise spun yarns, wherein at least some of the spun yarns comprise at least one of a meta-aramid, para-aramid, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, or melamine.

3. The fabric of claim 1, wherein the relatively tough yarns are arranged in a grid pattern within the fabric body.

4. The fabric of claim 3, wherein the grid pattern is formed by single relatively tough yarns.

5. The fabric of claim 3, wherein the grid pattern is formed by groups of two or more relatively tough yarns that are woven along with each other in the fabric body.

6. The fabric of claim 1, wherein at least some the filament yarns comprise a filament comprising at least one of polybenzoxazole, carbon, or high density polyethylene.

7. The fabric of claim 1, wherein at least some of the filament yarns comprise at least one polybenzoxazole filament.

8. The fabric of claim 1, wherein at least some of the filament yarns have a weight between approximately 50 and 600 denier, inclusive.

9. The fabric of claim 1, wherein the at least some relatively tough yarns each further comprises a spun yarn comprising at least one of a meta-aramid, para-aramid, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, or melamine.

10. The fabric of claim 9, wherein at least some of the spun yarns have yarn counts between 8 and 55, inclusive.

11. The fabric of claim 1, wherein the at least some relatively tough yarns further comprise a plurality of flame resistant fibers.

12. The fabric of claim 11, wherein at least some of the flame resistant fibers comprise at least one of a meta-aramid, para-aramid, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, or melamine.

13. A protective garment comprising the fabric of claim 1.

14. The garment of claim 13, wherein at least some of the body yarns comprise spun yarns comprising at least one of a meta-aramid, para-aramid, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, or melamine.

15. The fabric of claim 13, wherein the relatively tough yarns are arranged in a grid pattern within the fabric body.

16. The garment of claim 15, wherein the grid pattern is formed by single relatively tough yarns.

17. The garment of claim 15, wherein the grid pattern is formed by groups of two or more relatively tough yarns that are woven together in the fabric body.

18. The garment of claim 13, wherein at least some of the filament yarns comprise a filament comprising at least one of polybenzoxazole, carbon, or high density polyethylene.

19. The garment of claim 13, wherein at least some of the filament yarns comprise at least one polybenzoxazole filament.

20. The garment of claim 13, wherein at least some of the filament yarns have a weight between approximately 50 and 600 denier, inclusive.

21. The fabric of claim 13, wherein the at least some relatively tough yarns further comprise a spun yarn comprising at least one of a meta-aramid, para-aramid, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, or melamine.

22. The fabric of claim 21, wherein at least some of the spun yarns have yarn counts between approximately 8 and 55, inclusive.

23. The fabric of claim 13, wherein the at least some relatively tough yarns further comprise a plurality of flame resistant fibers.

24. The fabric of claim 23, wherein at least some of the flame resistant fibers comprise at least one of a meta-aramid, para-aramid, flame resistant cellulosic material, flame resistant wool, flame resistant polyester, polyvinyl alcohol, polytetrafluoroethylene, polyvinyl chloride, polyetheretherketone, polyetherimide, polysulfar, polychlal, polyimide, polyamide, polyimideamide, polyolefin, polybenzoxazole, polybenzimidazole, carbon, modacrylic, or melamine.

25. A flame resistant fabric, comprising:
   a plurality of flame resistant body yarns that form a body of the fabric, wherein each body yarn comprises a diameter; and
   a plurality of relatively tough yarns provided in discrete positions within the fabric body, wherein each relatively tough yarn comprises a diameter and wherein the relatively tough yarns comprise a filament yarn;
   wherein the diameter of the relatively tough yarns is the same or smaller than the diameter of the body yarns so that the relatively tough yarns do not protrude beyond an outer surface of the fabric body.

* * * * *